(No Model.)

J. H. MATHERS.
EVAPORATING PAN.

No. 262,075. Patented Aug. 1, 1882.

Witnesses.
W. W. Mortimer.
H. H. Greenwell.

Inventor.
Jas. H. Mathers,
per
F. A. Lehmann,
atty.

UNITED STATES PATENT OFFICE.

JAMES H. MATHERS, OF ORANGEVILLE, INDIANA.

EVAPORATING-PAN.

SPECIFICATION forming part of Letters Patent No. 262,075, dated August 1, 1882.

Application filed May 17, 1882. (No model.)

*To all whom it may concern:*

Be it known that I, JAMES H. MATHERS, of Orangeville, in the county of Orange and State of Indiana, have invented certain new and useful Improvements in Evaporating-Pans; and I do hereby declare the following to be a full, clear, and exact description of the invention, such as will enable others skilled in the art to which it pertains to make and use it, reference being had to the accompanying drawings, which form a part of this specification.

My invention relates to an improvement in evaporating-pans; and it consists in the combination of a suitable furnace having suitable racks formed on each side of both of its ends with a double evaporating-pan provided with shafts which have secured to them suitable pinions for engaging with the racks, whereby either one of the pans can be moved over the fire, while the other one is allowed to cool or to have its contents removed, and thus the pan be kept constantly in use, as will be more fully described hereinafter.

The object of my invention is to provide a means whereby two pans can be operated at once, and thus prevent the necessity of having to draw the fire in the furnace, and a loss of time that is always incurred where but a single pan is worked at a time.

Figure 1:
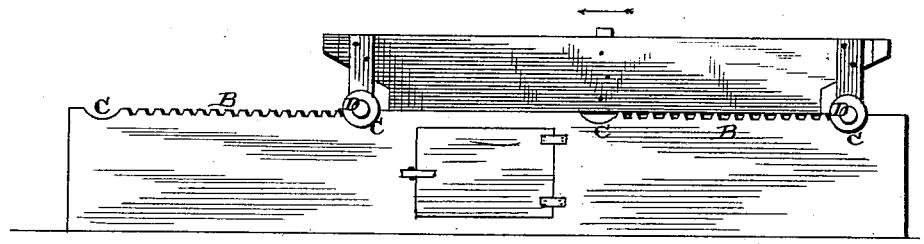
Figure 2:
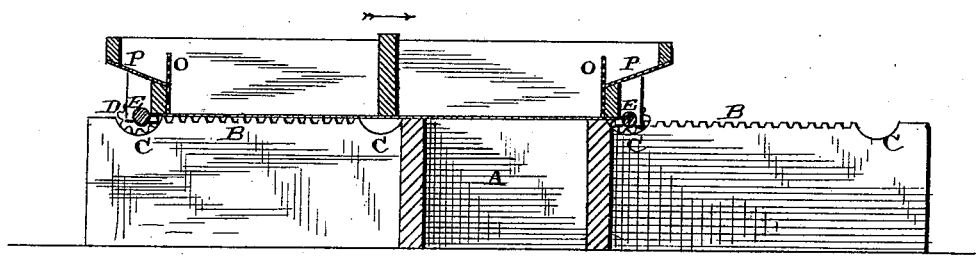

Figure 1 is a front elevation of my invention. Fig. 2 is a vertical cross-section of the same.

A represents a suitable furnace, which has the racks B extending beyond each of its sides at both of its ends. These racks may be of any suitable construction, and will have the recesses C formed in them at suitable intervals, so that the pinions D upon the shafts E will run down into them, and thus hold the pans in position. Instead of using but the single pan, I make either one large pan and divide it at its center, so as to form two, or else make two separate pans and unite them together so as to form one large pan. Upon each outer edge of the bottom of this pan is journaled the shaft E, which extends from one end of the pan to the other, and which is provided with the pinions at each end, so as to engage with the rack. By applying a handle or crank of any suitable kind to the shaft on that side in the direction in which the pan is to be moved the pan can be moved laterally, so as to bring either one of the divisions of the pan over the furnace. By this means, while one pan is over the furnace the other pan can be emptied and then filled again, so as to be ready to be again moved over the fire as soon as the contents of the other pan have been sufficiently evaporated. By this means one pan is kept always in use, and after the fire has once been lighted in the furnace it can be kept continuously up as long as is necessary. Where but a single pan is used, when its contents become sufficiently evaporated the fire must be drawn and the contents removed from the pan before another quantity of liquid can be poured into it, and hence much time is always wasted.

In order to cause the liquid to skim itself, there is attached to the outer side of each pan a strip of finely-perforated metal, O, which, while it will allow the liquid to pass freely through, will prevent the scum from returning into the body of the pan. When the heat is applied to the bottom of the pan and the liquid begins to boil the scum is driven over toward the inclined edges P of the pan and over the tops of the strainers. This scum will stay upon this side until the liquid has been evaporated to fall sufficiently below the top edge of the strainer, and then the scum will be caught upon the outer side of the strainer, where it can readily be removed.

Having thus described my invention, I claim—

1. The combination of a single furnace having the racks B extending from opposite side , a laterally-moving double pan provided with the shafts E, and pinions D, substantially as shown.

2. The combination of the furnace A, having the racks B, provided with the recesses C in their top edges, the double pan, the shafts E, and pinions D, substantially as set forth.

In testimony whereof I affix my signature in presence of two witnesses.

JAMES H. MATHERS.

Witnesses:
JAMES A. JENKINS,
JACOB H. STEPHENS.